United States Patent
Reitsma et al.

(10) Patent No.: US 9,386,605 B2
(45) Date of Patent: Jul. 5, 2016

(54) MOBILE DYNAMIC MESH CLUSTER BRIDGING METHOD AND APPARATUS AT INCIDENT SCENES

(71) Applicant: MOTOROLA SOLUTIONS, INC, Schaumburg, IL (US)

(72) Inventors: Katrin Reitsma, Chicago, IL (US); Anthony R Metke, Naperville, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 88 days.

(21) Appl. No.: 14/328,817

(22) Filed: Jul. 11, 2014

(65) Prior Publication Data

US 2016/0014818 A1    Jan. 14, 2016

(51) Int. Cl.
*H04W 84/18* (2009.01)
*H04W 76/00* (2009.01)

(52) U.S. Cl.
CPC ............ *H04W 76/007* (2013.01); *H04W 84/18* (2013.01)

(58) Field of Classification Search
CPC .... H04L 45/46; H04W 28/021; H04W 84/18; H04W 24/00; H04W 24/02
USPC ......... 370/252, 254–255, 311, 328–329, 338, 370/401, 406; 455/68, 445, 454, 408, 455/456.1; 340/870.01
See application file for complete search history.

(56) References Cited

U.S. PATENT DOCUMENTS

| | | | |
|---|---|---|---|
| 6,980,524 B1 | 12/2005 | Lu et al. | |
| 7,561,050 B2 | 7/2009 | Bhogal et al. | |
| 7,711,371 B2 | 5/2010 | Basak et al. | |
| 7,792,050 B2 | 9/2010 | Metke et al. | |
| 7,944,853 B2 | 5/2011 | Eglin et al. | |
| 8,000,334 B2 | 8/2011 | Everson et al. | |
| 8,131,210 B2 | 3/2012 | Couper | |
| 8,284,711 B2 | 10/2012 | Michalson et al. | |
| 8,532,060 B2 * | 9/2013 | Reumerman | H04W 24/00 370/255 |
| 8,539,225 B2 * | 9/2013 | Guo | H04L 63/0823 713/156 |
| 8,577,998 B2 | 11/2013 | Ver Steeg et al. | |
| 8,665,785 B2 | 3/2014 | Beck et al. | |
| 8,897,169 B2 * | 11/2014 | Schrum, Jr. | H04L 45/02 370/248 |
| 8,964,634 B2 * | 2/2015 | Jing | H04L 12/2832 370/328 |
| 2003/0005162 A1 | 1/2003 | Habetha | |
| 2006/0066455 A1 * | 3/2006 | Hancock | H04Q 9/00 340/870.01 |

(Continued)

FOREIGN PATENT DOCUMENTS

WO    02/078272 A1    10/2002
WO    2007013914 A1    2/2007

OTHER PUBLICATIONS

Intellectual Property Office, Patent Directorate, Patens Act 1977: Search Report Under Section 17, GB Appl. No. GB1511100.8, mailed: Dec. 21, 2015, all pages.

(Continued)

*Primary Examiner* — Mohamed Kamara

(57) ABSTRACT

A mobile dynamic mesh cluster bridging method and a mobile device include scanning various wireless channels at an incident scene to identify one or more nodes transmitting a given network identifier; determining a first cluster of the one or more identified nodes are not in communication with a second cluster of the one or more nodes; determining a location for bridging the first cluster and the second cluster; and causing a bridging function to be deployed at the location to provide communication between the first cluster and the second cluster.

19 Claims, 7 Drawing Sheets

(56) References Cited

U.S. PATENT DOCUMENTS

| | | | |
|---|---|---|---|
| 2006/0193334 A1 | 8/2006 | Hazra et al. | |
| 2007/0091871 A1 | 4/2007 | Taha | |
| 2007/0211736 A1* | 9/2007 | Sapek | H04L 45/00 370/401 |
| 2008/0075034 A1 | 3/2008 | Hsieh | |
| 2008/0112422 A1 | 5/2008 | Jetcheva et al. | |
| 2008/0205360 A1* | 8/2008 | Ren | H04W 40/32 370/338 |
| 2009/0147702 A1 | 6/2009 | Buddhikot et al. | |
| 2009/0268652 A1* | 10/2009 | Kneckt | H04W 52/0235 370/311 |
| 2010/0150027 A1 | 6/2010 | Atwal et al. | |
| 2010/0202345 A1 | 8/2010 | Jing et al. | |
| 2010/0246542 A1* | 9/2010 | Orth | H04W 84/18 370/338 |
| 2012/0051340 A1 | 3/2012 | Patil et al. | |
| 2013/0229910 A1 | 9/2013 | McKnight, Jr. et al. | |
| 2014/0355476 A1* | 12/2014 | Anderson | H04W 24/02 370/254 |
| 2015/0245412 A1* | 8/2015 | Tyson | H04L 43/0817 370/338 |

OTHER PUBLICATIONS

Perumal, S. and Baras, J.S., "Aerial Platform Placement Algorithm to Satisfy Connectivity and Capacity constraints in Wireless Ad-Hoc Networks," IEEE Global Telecommunications Conference, 2008, IEEE GLOBECOM 2008, Nov. 30, 2008-Dec. 4, 2008, pp. 1-5.

Patent Examination Report No. 1 mailed Dec. 4, 2015, for corresponding Australian Patent Application No. 2015203887, filed Jul. 10, 2015.

Notice of Acceptance mailed Feb. 10, 2016, for corresponding Australian Patent Application No. 2015203887, filed Jul. 10, 2015.

* cited by examiner

MOBILE DYNAMIC MESH CLUSTER BRIDGING METHOD AND APPARATUS AT INCIDENT SCENES

BACKGROUND OF THE INVENTION

In mobile, wireless networking, there can be a large number of stationary devices and mobile devices at an incident scene. Exemplary stationary devices and mobile devices can include surveillance cameras, two-way radios, lapel worn cameras/microphones, smart glasses, tablets, Long Term Evolution (LTE) devices, devices in command vehicles, unmanned aerial vehicles (UAVs), etc. The stationary devices and mobile devices can dynamically form a mesh network using Wireless Local Area Network (WLAN) technologies to enable communications among the network nodes and provide access to mission-critical services and information. Additionally, the services can include broadband access to a backend network via a gateway (e.g. through a high speed gateway in the command vehicle), access to video streams of surveillance cameras and other real-time mission critical information or services made available by one of the network nodes or the backend network. The use of mesh networks improves communications and availability of mission critical services at incident scenes. These networks can be used both to offload the backend communications resources, as well as a primary method of communications at the incident scene when the incident scene is disconnected from backend infrastructure services.

One problem in such incident mesh networks is that the network nodes may form two or more independent IBSSs (Independent Basic Service Sets) because they are out of range of each other and/or use different WLAN channels. This leads to separate clusters, or separate mesh networks with a same SSID (Service Set Identification). Another reason for separated mesh clusters could be the use of different wireless communication technologies by groups of nodes, such as IEEE 802.11 and variants thereof (Wi-Fi), 802.15.1 (Bluetooth), 802.15.4 (ZigBee), and 802.16 (WiMAX). Nodes in separate clusters cannot communicate with each other and may not even be aware of each other, including the available services in the other cluster(s). Hence, available mission-critical information and services cannot be fully utilized across all available devices.

Another reason for the unintended formation of disjoint clusters can occur when strong security mechanisms are added to the ad hoc networking protocols. Many commonly deployed ad hoc networks overlook security completely while other ad hoc network solutions provide overly simplistic security models (such as give every node the same key) which often prove impractical and insecure in real life applications. When it is assumed that all nodes have access to the same key used to secure the Media Access Control (MAC) layer, or when no security is used, bridging between groups of nodes occurs inherently whenever a bridging node is in range of both groups, because in these systems all route requests are broadcast and as long as there is a path between any two nodes they are able to find each other and communicate. However, once stronger security is required, it is not usually possible to simply broadcast route requests that all neighboring nodes are able to receive. Even if all nodes are in range of each other (in a fully connected topology) by adding strong security, this immediately breaks the inherent bridging that typically occurs in an ad hoc mesh networks. This results in a much greater likelihood that disjoint clusters occur.

Further, when strong security is applied to ad hoc networks, various functions like "service discovery" break because some nodes can no longer talk to each other. Common methods like multicast Domain Name System (MDNS) and DNS Service Discovery (DNS-SD) rely on the existence of a single broadcast domain on which service discovery messages can be broadcast or multicast. As discussed above, adding strong security means that a single broadcast domain is much more unlikely due to the natural clustering that would occur simply because of the added security.

In summary, disjoint clustering of ad hoc network nodes at an incident scene can occur for many reasons such as nodes are out of range of each other, nodes not originally in coverage with an existing cluster choose a different channel, nodes may use different wireless technologies, Bluetooth Wi-Fi, Zigbee, WiMAX, etc.; arriving nodes choose only one node to authenticate with and exchange multicast broadcast keys—even if they choose more than one, unless they exchange keys with every node present they cannot guarantee that clustering does not occur; etc.

Regardless of the reason, the occurrence of disjoint clusters is a serious problem that can prevent communications necessary to effectively and safely manage an incident scene. Current WLAN and Mesh Network protocols and standards (such as IEEE 802.11s and ZigBee) do not address the dynamic bridging of disjoint network clusters and cannot enable communications and services across such network clusters Accordingly, there is a need for mobile dynamic mesh cluster bridging method and apparatus at incident scenes.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
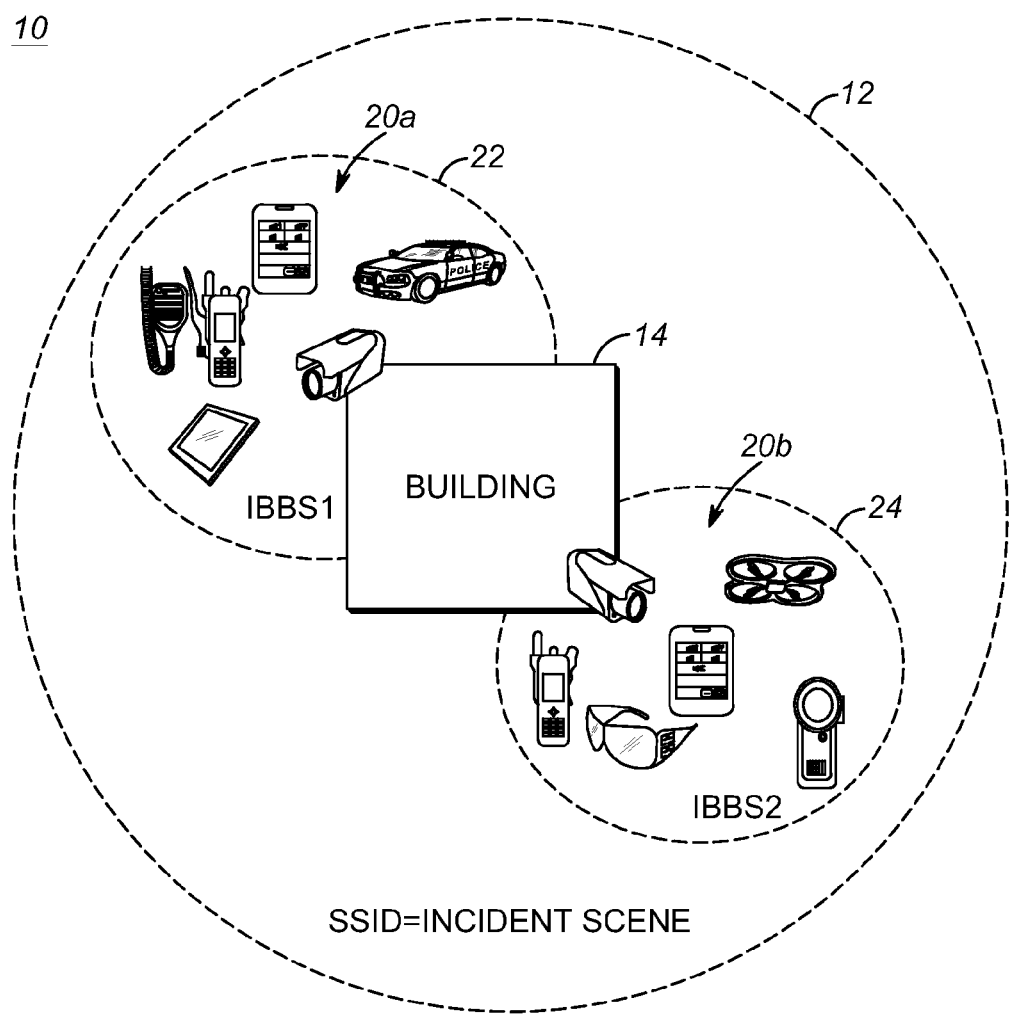
FIG. 1 is a network diagram of a network located at an exemplary incident scene for describing the method and apparatus in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary embodiment, a mobile dynamic mesh cluster bridging method includes scanning various wireless channels at an incident scene to identify one or more nodes transmitting a given network identifier; determining a first cluster of the one or more identified nodes are not in communication with a second cluster of the one or more nodes; determining a location for bridging the first cluster and the second cluster; and causing a bridging function to be deployed at the location to provide communication between the first cluster and the second cluster.

In another exemplary embodiment, a mobile device includes a network interface; a processor communicatively coupled to the network interface; and memory storing instructions that, when executed, cause the processor to: scan, via the network interface, various wireless channels at an incident scene to identify one or more nodes transmitting a given network identifier; determine a first cluster of the one or more identified nodes are not in communication with a second cluster of the one or more nodes; determine a location for bridging the first cluster and the second cluster; and cause a bridging function to be deployed at the location to provide communication between the first cluster and the second cluster.

In yet another exemplary embodiment, a coordinating server includes a network interface communicatively coupled to a plurality of devices at an incident scene; a processor communicatively coupled to the network interface; and memory storing instructions that, when executed, cause the processor to receive a request from a detection node to perform a bridging function between a first cluster and a second cluster at a specified location, wherein the first cluster and the second cluster are disjoint from one another and are at an incident scene; identify a bridging node at or near the specific location to perform the bridging function; and transmit the request to the bridging node to perform the bridging function.

In various exemplary embodiments, a mobile dynamic mesh cluster bridging method and apparatus at incident scenes is described. The method and apparatus use a detection node, a coordinator, and a bridging node to dynamically orchestrate and execute the bridging of network clusters whenever a bridging node is not readily in place and able to connect clusters. This can include scanning for clusters, requesting a bridge, placing a bridge, connecting clusters, and enabling secure communications and services across clusters. The method and apparatus dynamically bridges multiple broadcasts domains that occurred due to the use of strong security, different wireless technologies, range issue, and the like. The method and apparatus dynamically requests a mobile bridge from a coordinating function, and the mobile bridge travels to a geographic location that enables the bridge to connect identified mesh clusters. The method and apparatus verifies whether the bridge node is authorized to connect the mesh clusters and enables the use of strong security to protect communications and services across clusters.

The method and apparatus discovers the need for a wireless network cluster bridge, and deploys and provides the needed bridge service. Advantageously, the bridging is provided between disjoint network clusters with secure delivery of authorized bridging services. Detection nodes add functionality to wireless devices to scan for networks after finding the desired network as specified by a network name or identifier such as the WLAN SSID, and the ability to recognize that multiple disjoint clusters exist, and the capability to request a bridge to a specified location. The method and apparatus can also include a device that responds to a request to travel to a given location, identify nodes from disjoint network clusters, securely join each cluster and bridge the two or more wireless network clusters.

FIG. 1 is a network diagram of a network 10 located at an exemplary incident scene 12 for describing the method and apparatus. The network 10 is located at the incident scene 12 which includes a building 14 for illustration purposes. Various devices 20, labeled as devices 20a, 20b, are located at the incident which can include any stationary device or mobile device with wireless connectivity and optionally wired connectivity. The devices 20a, 20b can also be referred to as nodes herein. The devices 20 can form ad hoc wireless networks and are all configured with an SSID set the same based on the incident scene. All of the devices 20a, 20b need to communicate with one another, but the devices 20a have formed a first cluster 22 (e.g., with IBSS1) and the devices 20b have formed a second cluster 24 (e.g., with IBSS2). The clusters 22, 24 have no communication between one another.

Figure 2:
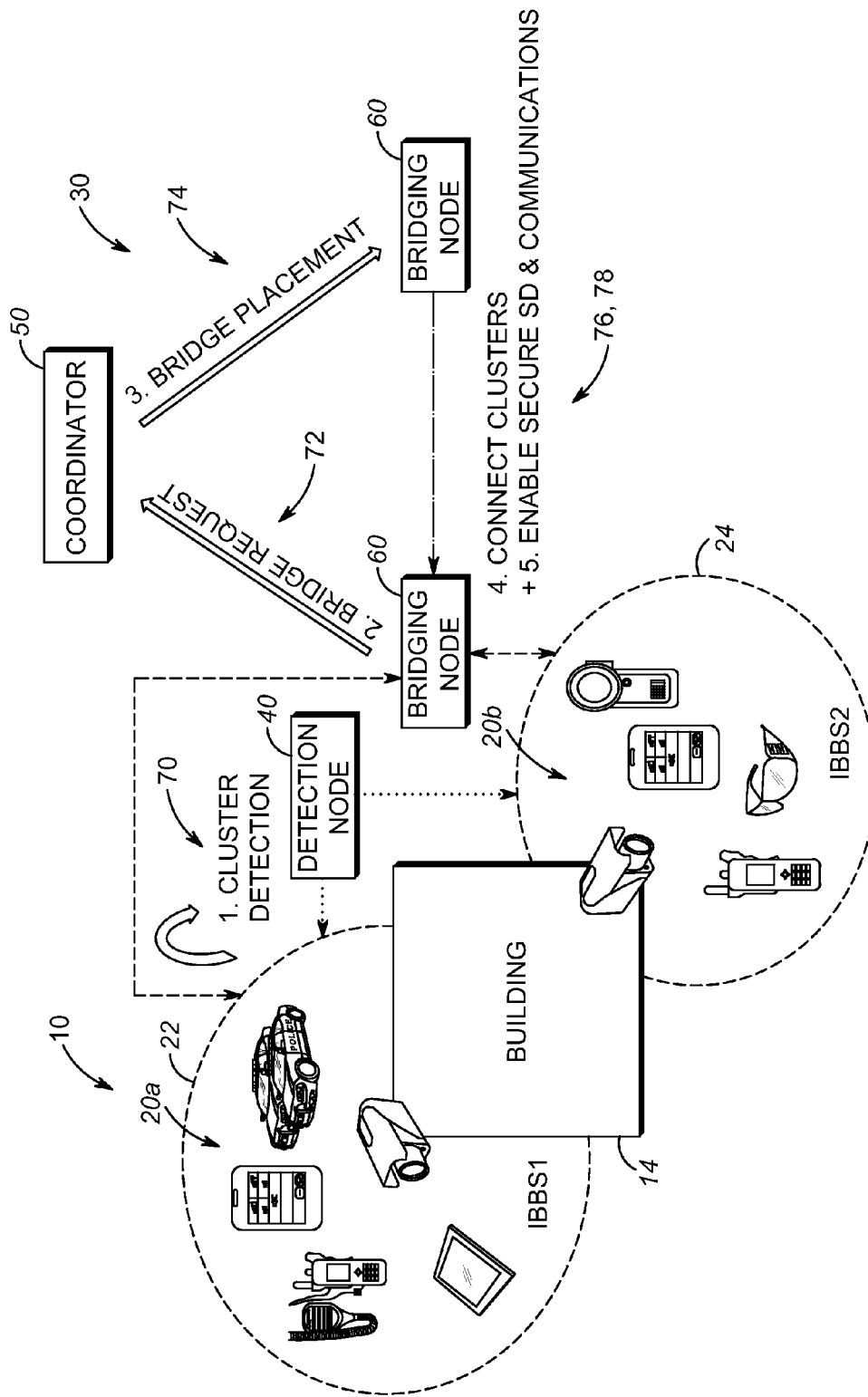
FIG. 2 is a network diagram of the network of FIG. 1 illustrating an exemplary operational scenario of a mobile dynamic mesh cluster bridging method at incident scenes in accordance with some embodiments.
Figure 3:
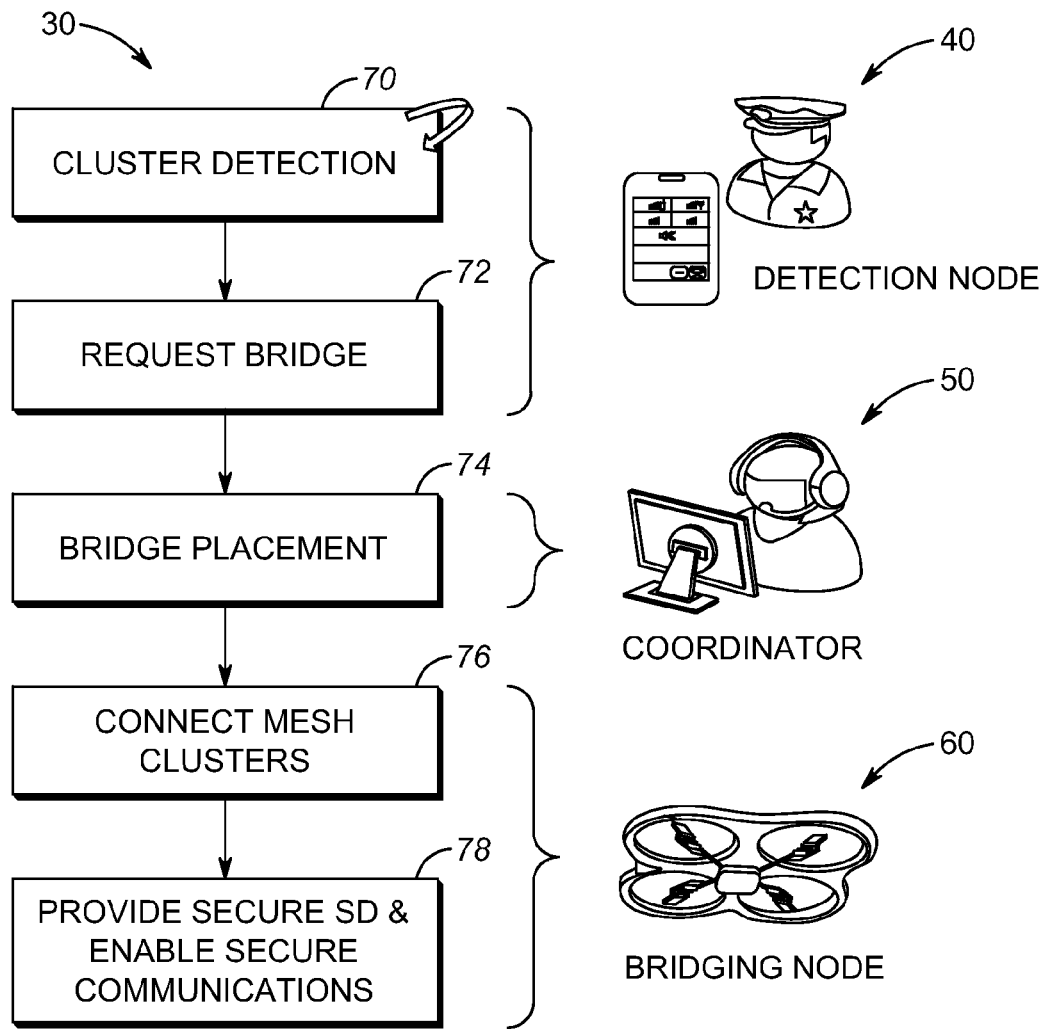
FIG. 3 is a flowchart of the mobile dynamic mesh cluster bridging method of FIG. 2 at incident scenes in accordance with some embodiments.

FIG. 2 is a network diagram of the network 10 illustrating an exemplary operational scenario of a mobile dynamic mesh cluster bridging method 30 at incident scenes. FIG. 3 is a flowchart of the mobile dynamic mesh cluster bridging method 30 at incident scenes. The network 10 includes a detection node 40, a coordinator 50, and a bridging node 60 that each operate collectively to bridge the clusters 22, 24 through the mobile dynamic mesh cluster bridging method 30. Generally, the mobile dynamic mesh cluster bridging method 30 includes running a cluster detection algorithm on enabled devices at an incident scene (e.g., the detection node 40 which can be a Public Safety (PS) device) (step 70), having such devices send out a request for a "bridging node" whenever two (or more) network clusters have been detected (step 72), moving the bridging node 60 to the requested location (step 74), using the bridging node 60 to connect the detected clusters and enabling secure cross cluster service discovery and communications (steps 76, 78).

The mobile dynamic mesh cluster bridging method 30 includes several new functions necessary to accomplish these goals. Specifically, the mobile dynamic mesh cluster bridging method 30 introduces new roles in the network 10 at the incident scene 12 for the detection nodes 40, the coordinator 50, and the bridging nodes 60.

Detection Node

The detection nodes 40 can be PS devices at the incident scene 12 which are equipped with software to perform background scans to detect the network clusters 22, 24. The detection nodes 40 are normally unable to provide the needed bridging capability. Instead, the detection nodes 40 can be mobile devices on scene which operate in the background to detect the disjoint network clusters 22, 24. The detection nodes 40 can be mobile devices such that they move around the incident scene 12 to detect different locations.

Coordinator

The coordinator 50 includes a coordinating function which receives bridging requests from the detection nodes 40 and coordinates the action of moving the bridging node 60 to the requested location. In an exemplary embodiment, the coordinator 50 can include a server that is communicatively coupled to the detection nodes 40 and the bridging node 60. That is, the coordinator 50 can receive requests from the detection nodes 40 and cause placement of the bridging node 60 based thereon.

Bridging Node

The bridging node 60 can be a mobile/portable device carried by a first responder, an unmanned vehicle such as a robot or drone, or a device mounted on PS vehicle such as a squad car. A device acting as the bridging node 60 has the following properties: 1) is a mobile or portable device that can be brought into range of network clusters 22, 24; 2) has a reliable power source; 3) has the capability to authenticate to at least one node in each network clusters 22, 24; and 4) has at least two IEEE 802.11 radios that can simultaneously transmit/receive (multi radio).

In an exemplary embodiment, the bridging node 60 uses shared secret keys for authenticating to the clusters 22, 24 (e.g. a static pre-provisioned agency key or a dynamic key that has been established through a secure out-of-band channel at the incident scene). In another exemplary enablement, the bridging node 60 supports multiple radio technologies (e.g. Wi-Fi and WiMAX) in addition or as a substitute for multiple Wi-Fi radios. In an exemplary embodiment, the bridging node performs a method of bridging two wireless communications networks, with the bridging node 60 configured to: receive a request to perform a bridging function, travel to a location specified in the request, identify at least one node in each cluster, authenticate to at least one node in each cluster, and perform bridging between the multiple clusters.

Cluster Detection

The detection nodes 40 periodically search for the network clusters 22, 24 (e.g. IBSSs) in range. In another exemplary embodiment, the search can triggered by the device user, a context-based policy engine on the device, or a signal sent from a remote management server, such as the coordinator 50. The impact on other mission critical actions performed by such enabled detection nodes 40 can be minimized by several settings and thresholds, e.g., scans are only performed if the device has sufficient battery power, free CPU cycles, etc. A device acting as the detection node 40 must be able to request the bridging node, which requires connectivity to a special coordinating server, or dispatch, etc. In an exemplary embodiment, various first responders can be configured with the detection node 40 functionality such that the incident scene 12 is covered. Since the detection node 40 functionality can operate in the background, this does not impact overall device performance.

The detection nodes 40 act as sniffers at the incident scene 12 to perform autonomous scans. The detection nodes 40 can utilize various techniques to detect the network clusters 22, 24 that should be, but are not connected. Note, in the method and apparatus described herein, the network clusters 22, 24 are disjoint, i.e. do not have any device common to both. A first detection technique can include detecting a same SSID in two different locations but different BSSID (basic service set identification) or MAC address in the WLAN header. Here, the SSID means that the clusters 22, 24 should be connected, but the BSSID or MAC address means they are isolated, i.e. all nodes connected together agree to the same BSSID, and the difference is indicative of isolation. A second detection technique can include using a MESH ID field in the WLAN header. For example, the MESH ID can be the same for various locations, but the SSID can be different indicative of isolation. Alternatively, the SSID can be the same for various locations, but the MESH ID is different indicative of isolation. Other techniques are also contemplated.

Bridge Request

Once two or more clusters have been detected such as in the network 10 with the network clusters 22, 24, the detection node 40 requests the bridging node 60 by notifying the coordinator 50 that the bridging node 60 is needed at its current device location or another specified location. This notification may include geographic location information, wireless technology or channels needed, cryptographic information, required authorization credentials, SSID, or other network identifying information.

Bridge Placement

Upon receiving the request, the coordinator 50, in an exemplary embodiment, sends out a request to an available officer on the scene who has a bridge capable device and asks the officer to move to the requested location and either remain there or drop off the bridging node 60 at the location. In another exemplary enablement, the coordinator 50 sends a drone or robot with bridging capabilities to the location. In yet another exemplary embodiment, the coordinator 50 sends a request to the operator of a vehicle (e.g. command van) that is part of one of the clusters 22, 24 to move the vehicle to the location in order to bridge the clusters 22, 24.

Connect Mesh Clusters

Once the bridging node 60 is at the requested location, it uses its credentials to authenticate to each mesh cluster 22, 24. In an exemplary embodiment, the bridging node 60 selects at least one node to peer with from each cluster 22, 24, and performs mutual authentication with these nodes. In the case where the wireless technology is WLAN, IEEE 802.11i techniques could be used to form a RSN (robust secure network) connection with each of the chosen peers. As described in IEEE 802.11i, either EAP (Extensible Authentication Protocol) or PSK (Pre-Shared Key) methods are available during authentication to an RSN. In an exemplary embodiment, the use of EAP-TLS (Transport Layer Security) allows the bridging node 60 to authenticate with any node form an agency with which one of the Bridges CAs (Certificate Authorities) have cross-signed.

In another exemplary embodiment, the bridging node 60 uses shared secret keys for authenticating to the selected peer in each of the clusters 22, 24 (e.g. a static pre-provisioned agency key or a dynamic key that has been established through a secure out-of-band channel at the incident scene). Whether EAP-TLS or PSK authentication is used, the RSN methods establish peer-to-peer security associations, and support the distribution of group keys as well. These group keys can be used for multicast and broadcast communications to support mesh routing and service discovery, however these group keys are not known outside the cluster. In yet another exemplary embodiment, the bridging node 60 supports multiple radio technologies (e.g., Wi-Fi and WiMAX) in addition to or as a substitute for multiple Wi-Fi radios.

Secure Cross Cluster Service Discovery and Secure Communications

A successful authentication authorizes the node to act as the bridging node 60 for these network clusters 22, 24. As the bridging node 60, the device can perform the actions as follows. First, the bridging node 60 provides service discovery information to cluster nodes performing service discovery. The bridging node 60 can participate in standard service discovery protocols, such as MDNS (multicast Domain Name System) or DNS-SD (Domain Name System service discovery). It can either forward these messages between the clusters 22, 24 or it may proxy for services that it discovers in each cluster 22, 24.

Second, the bridging node 60 acts as a joint network node connecting the clusters 22, 24 such that all nodes can communicate with each other via the bridging node 60. The bridging node 60 forms an SA (source address) with at least one node in each cluster, it can then receive packets on one side and forward them to the other side. This includes unicast, multicast and broadcast packets. Third, the bridging node 60, as such a joint network node, performs all necessary message conversions if the clusters use different wireless communication technologies (e.g. from IEEE 802.11 to IEEE 802.16 or vice versa). In essence, the bridging node 60 is acting as a specialized router. As a router it can operate over many different MAC (media access control) or link layer protocols.

Fourth, when desired, the bridging node 60 coordinates switching to the same Wi-Fi channel across the clusters 22, 24 if the clusters 22, 24 operate on different channels ("channel synchronization"). Fifth, whenever the clusters 22, 24 use the same Wi-Fi channel, the bridging node 60 declares and coordinates a "bridge period" as part of the channel contention phase to avoid collisions. For example, the bridging node 60 determines that a first cluster has many more participants than a second cluster, and tells the second cluster to change channels.

Detection Node Acting as the Coordinator

In another exemplary embodiment, the detection node 40 can also act as the coordinator 50. Once the detection node 40 detects two or more clusters 22, 24, the detection node 40 signals nodes in each BSS that a bridge is needed at its coordinates. For example, the detection node 40 can transmit a service request into each cluster 22, 24. This may require the bridging node 60 to authenticate with one node from each cluster 22, 24 to if it has not already done so, to obtain secure multicast group keys. Once the keys are obtained the detection node 40 transmits a service request message, which is propagated throughout the cluster 22, 24 in an identical fashion to a RREQ (Route Request) packet. The service request packet identifies the need for a bridge and location as well as any other requirements (such as wireless interfaces required). A node that is able to fulfill this request forwards a service reply message.

A node in one of the BSSs receiving such bridge request displays the coordinates on a map and notifies the user that a bridge capable node is needed at this location. The user of the device then takes actions to have the bridging node 60 placed at the requested location.

There are numerous ways to arbitrate when two or more nodes choose to fulfill the bridge function. For example, when a node generates a service reply, it will include a timestamp, and the node with the lowest timestamp value can perform the needed bridging function. In this exemplary embodiment, when a node responding to such a request successfully fulfills the bridging function, it transmits a service-fulfilled packet to acknowledge that the service is fulfilled. Other nodes may choose to re-arbitrate to provide the bridge service if they never receive this packet.

In an exemplary embodiment, the detection node 40 is configured to perform a method of bridging two wireless communications networks with the detection node 40 configured to: scan various wireless channels to identity one or more nodes transmitting a given network identifier, determine that a first portion of the identified nodes are not able to communicate with a second portion of the identified nodes, transmit an expanding ring search request to bridge the two portions to of the identified nodes to at least of node in each portion, and retransmit until at least one response is received.

Detection Node Acting as the Bridge Node

In a yet another exemplary embodiment, the detection node 40 also acts as the bridging node 60. Once the clusters 22, 24 have been detected, the detection node 40 remains in its current location. For instance, an autonomously moving device (e.g. a drone, or robot) comes to a halt or a carried device is dropped by the user. Then, the detection node 40 begins to act as the bridging node 60. Such devices can be purpose built devices, such as drones roaming an incident scene with the goal to connect clusters. In this exemplary embodiment, the coordinator 50 is not needed.

In this exemplary embodiment, one drone can move through the incident scene and scan for areas where multiple clusters can be found, i.e. acting as the detection node 40. When it finds such an area, it can provide the necessary bridging service at that point, or summon a separate bridge, while it continues scanning. If a drone doing this scanning discovers multiple clusters but cannot find an area where each/all clusters can be accessed, the drone may summon a second drone to a position where the second drone can access one cluster and communicate with the first drone when it is in a position to access a second cluster.

In an exemplary embodiment, the bridging node 60 is configured to perform a method of bridging two wireless communications networks with the bridging node 60 configured to receive a request to perform a bridging service at a specific location, determine that this node is capable to perform the bridging function, transmit a service response message and arbitrate with neighbor nodes to determine which node will fulfill the service, move to the location specified in the request, authenticate with at least one node in each cluster, and bridge traffic between the two clusters.

Coordinator Server

In an exemplary embodiment, each node at the incident scene 12 may send information to a coordinating server acting as the coordinator 50 with information about the WLAN cluster or mesh network that it is participating in (e.g. the SSID or Mesh ID) along with location information. In this case, the coordinating server will determine when two of more disconnected networks are present in one location. This could automatically trigger the deployment of the bridging node 60. In this exemplary embodiment, the bridging node 60 would have to autonomously discover the best location to perform the bridging. In an exemplary embodiment, the coordinator 50 can perform a method of bridging two wireless communications networks, with a wireless mobile "coordinator" node configured to: receive a request to perform a bridging function at a specific location, identify nodes capable to perform the needed bridging function, and transmit a request to the selected bridging node.

Bridging Method

Figure 4:
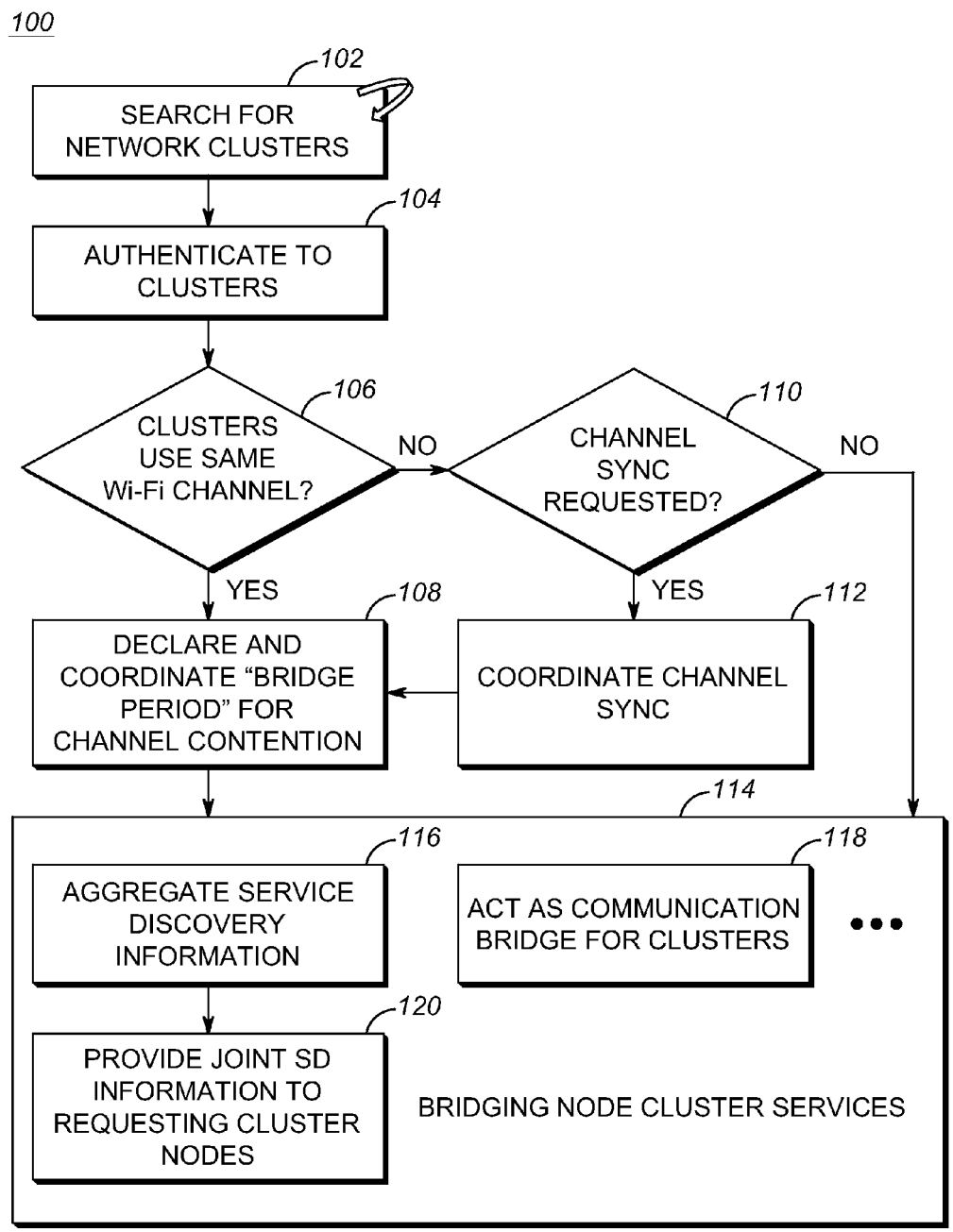
FIG. 4 is a flowchart of a bridging method for enabling services and communications across the clusters in accordance with some embodiments.

FIG. 4 is a flowchart of a bridging method 100 for enabling services and communications across the clusters 22, 24. For example, the bridging method 100 can be implemented by the detection node 40, by the detection node 40 and the bridging node 60, etc. The bridging method 100 includes actions at the bridging-capable device for successfully bridging clusters and thus enabling services and communications across the clusters 22, 24. The bridging method 100 includes searching for network clusters (step 102). This can be performed by the detection nodes 40, the bridging nodes 60, devices at the incident scene 12 communicating to the coordinator 50, etc. The objective of the searching is to intelligently discover that multiple clusters associated with a single purpose (e.g. a single incident scene) are accessible via one or more radio communications technologies or channels, but the clusters are isolated or disjoint from one another. The searching can be continuous in the background, periodic, on-demand, etc.

Once the device implementing the bridging method 100 detects disjoint clusters, such as the clusters 22, 24, the device authenticates to both the clusters 22, 24 (step 104). The bridging method 100 checks if the clusters 22, 24 use the same Wi-Fi channel (step 106), and if so, the device declares and coordinates a "bridge period" for channel contention (step 108). If the clusters 22, 24 do not use the same Wi-Fi channel (step 106), the bridging method 100 checks if channel synchronization is requested (step 110), and if so, the bridging method 100 coordinates channel synchronization (step 112), and goes to the step 108.

Subsequent to the steps 108, 110, the bridging method 100 performs bridging node cluster services (step 114). The bridging node cluster services include aggregating service discovery information (step 116), acting as a communication bridge for the clusters 22, 24 (step 118), and providing joint service discovery information to requesting cluster nodes (step 120).

Mobile Dynamic Mesh Cluster Bridging Method

Figure 5:
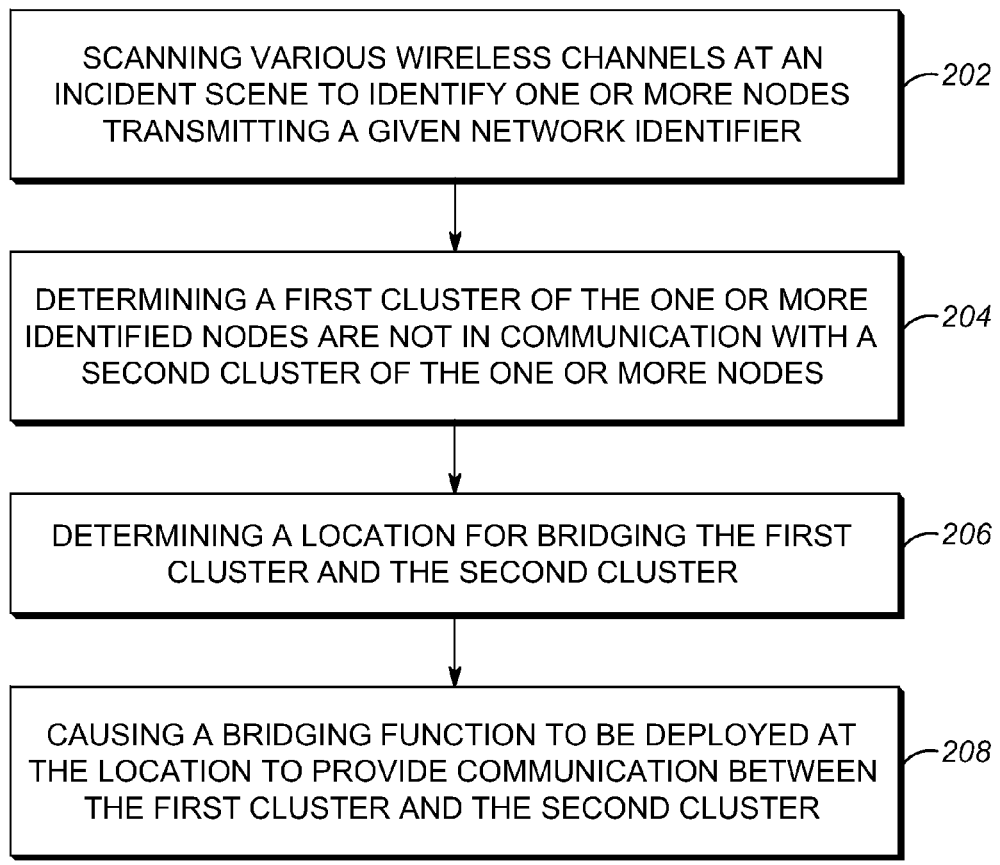
FIG. 5 is a flowchart of a mobile dynamic mesh cluster bridging method in accordance with some embodiments.

FIG. 5 is a flowchart of a mobile dynamic mesh cluster bridging method 200. The mobile dynamic mesh cluster bridging method 200 contemplates operation by one or more devices in a network, such as the devices 20a, 20b, 40, 60 in the network 10. The mobile dynamic mesh cluster bridging method 200 includes scanning various wireless channels at an incident scene to identify one or more nodes transmitting a given network identifier (step 202). This can include scanning the various wireless channels with a mobile device at the incident scene in background manner, wherein the mobile device comprises at least two radios with one used for the scanning. Here, one of the at least two radios is used for the scanning while the other is used for on-site connectivity. Also, the background manner can include operating such that mission-critical applications are not affected as described herein.

The mobile dynamic mesh cluster bridging method 200 includes determining a first cluster of the one or more identified nodes are not in communication with a second cluster of the one or more nodes (step 204). The first cluster and the second cluster are associated with a single purpose at the incident scene and are disjoint from one another. This can include determining the first cluster and the second cluster are disjoint based on the various wireless channels comprising any of Service Set Identification, Basic Service Set Identification, Media Access Control, and Mesh ID.

The mobile dynamic mesh cluster bridging method 200 includes determining a location for bridging the first cluster and the second cluster (step 206). The location is a place at the incident scene where the first cluster and the second cluster can be bridged together. The mobile dynamic mesh cluster bridging method 200 includes causing a bridging function to be deployed at the location to provide communication between the first cluster and the second cluster (step 208).

The mobile dynamic mesh cluster bridging method 200 can include performing the scanning step 202, the determining steps 204, 206, and the causing step 208 by a detection node (such as the detection node 40); and causing the bridging function by requesting dispatch of a bridging node (such as the bridging node 60) to the location. The bridging node can include any of a mobile device, a drone or robot, and a vehicle. The mobile dynamic mesh cluster bridging method 200 can include performing the scanning step 202, the determining steps 204, 206, and the causing step 208 by a detection node (such as the detection node 40); and causing the bridging function by performing cluster services by the detection node. The mobile dynamic mesh cluster bridging method 200 can include causing the bridging function by sending a request to a coordinator with geographic location information, wireless technology or channels needed, cryptographic information, required authorization credentials, and Service Set Identification.

The mobile dynamic mesh cluster bridging method 200 can include using credentials to authenticate the first cluster and the second cluster with the bridging function. Optionally, the mobile dynamic mesh cluster bridging method 200 can include authenticating each of the first cluster and the second cluster by selecting at least one node in each to peer with and perform mutual authentication utilizing IEEE 802.11i. Alternatively, the mobile dynamic mesh cluster bridging method 200 can include creating a robust secure network by a device performing the bridging function with at least one peer in the first cluster and at least one peer in the second cluster.

The mobile dynamic mesh cluster bridging method 200 can include providing service discovery information to nodes in the first cluster and in the second cluster performing service discovery through the bridging function. The mobile dynamic mesh cluster bridging method 200 can include acting as a joint node connecting the first cluster and the second cluster such that all nodes are in communication with each other via the bridging function. The mobile dynamic mesh cluster bridging method 200 can include performing message conversions if the first cluster and the second cluster utilize different wireless communication technologies.

The mobile dynamic mesh cluster bridging method 200 can include coordinating switching to a same Wi-Fi channel between the first cluster and the second cluster if operating on different channels. The mobile dynamic mesh cluster bridging method 200 can include coordinating between the first cluster and the second cluster as part of channel contention to avoid collisions.

The mobile dynamic mesh cluster bridging method 200 includes determining that the bridging function is needed and that an associated node is capable and authorized to provide this function. The mobile dynamic mesh cluster bridging method 200 can perform negotiating channel usage and beacon periods across the clusters; aggregating service discovery; performing multi-hop bridging between the previously independent clusters; etc.

Coordination Server

Figure 6:
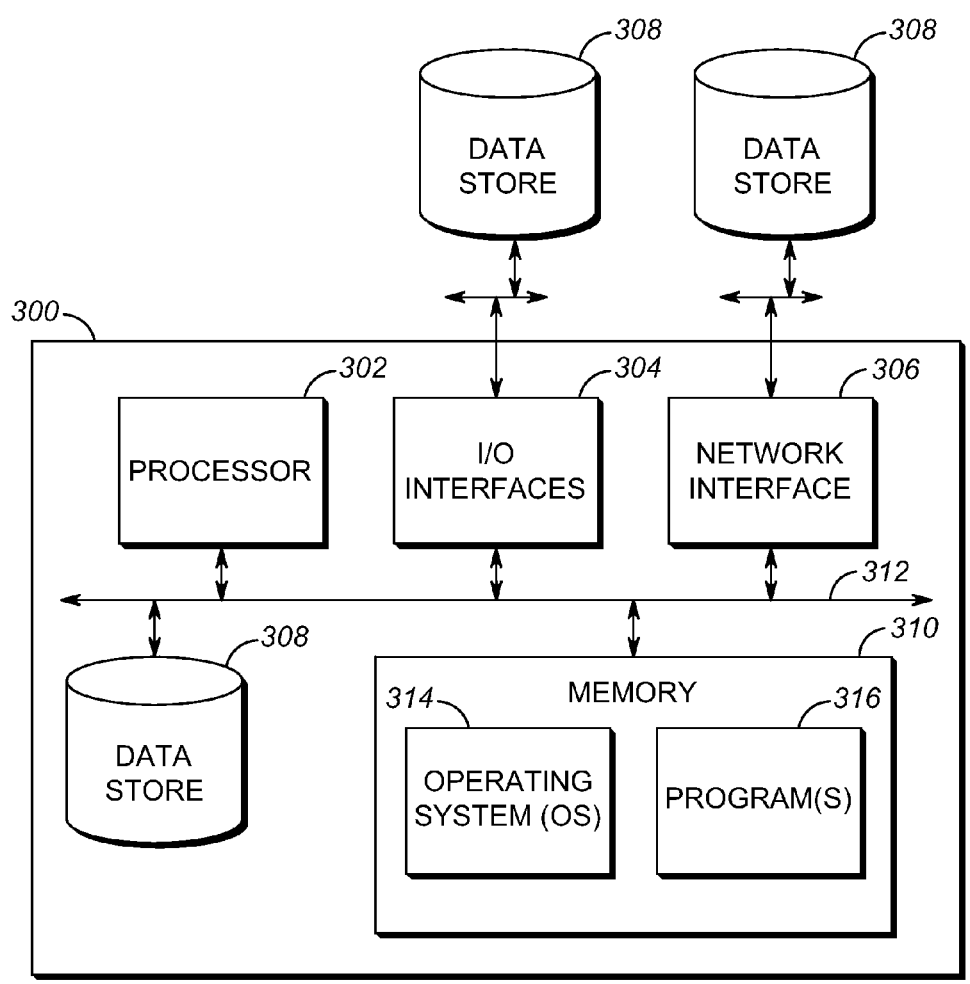
FIG. 6 is a block diagram of a controller which may be used for the coordinator in accordance with some embodiments.

FIG. 6 is a block diagram of a controller 300 which may be used for the coordinator 50. The controller 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 6 depicts the controller 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the controller 300, a semiconductor-based microprocessor (in the form of a microchip or chip set), or generally any device for executing software instructions. When the controller 300 is in operation, the processor 302 is configured to execute software stored within the memory 310, to communicate data to and from the memory 310, and to generally control operations of the controller 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the controller 300 to communicate on a network, such as the Internet, a wide area network (WAN), a local area network (LAN), and the like, etc. The network interface 306 may include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network 10. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the controller 300 such as, for example, an internal hard drive connected to the local interface 312 in the controller 300. Additionally in another embodiment, the data store 308 may be located external to the controller 300 such as, for example, an external hard drive connected to the I/O interfaces 304 (e.g., SCSI or USB connection). In a further embodiment, the data store 308 may be connected to the controller 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

In an exemplary embodiment, the controller 300 can include instructions, i.e., through a program 316, that, when executed, causes the processor 302 to receive a request from a detection node to perform a bridging function between a first cluster and a second cluster at a specified location, wherein the first cluster and the second cluster are disjoint from one another and are at an incident scene; identify a bridging node at or near the specific location to perform the bridging function; and transmit the request to the bridging node to perform the bridging function.

Mobile Device

Figure 7:
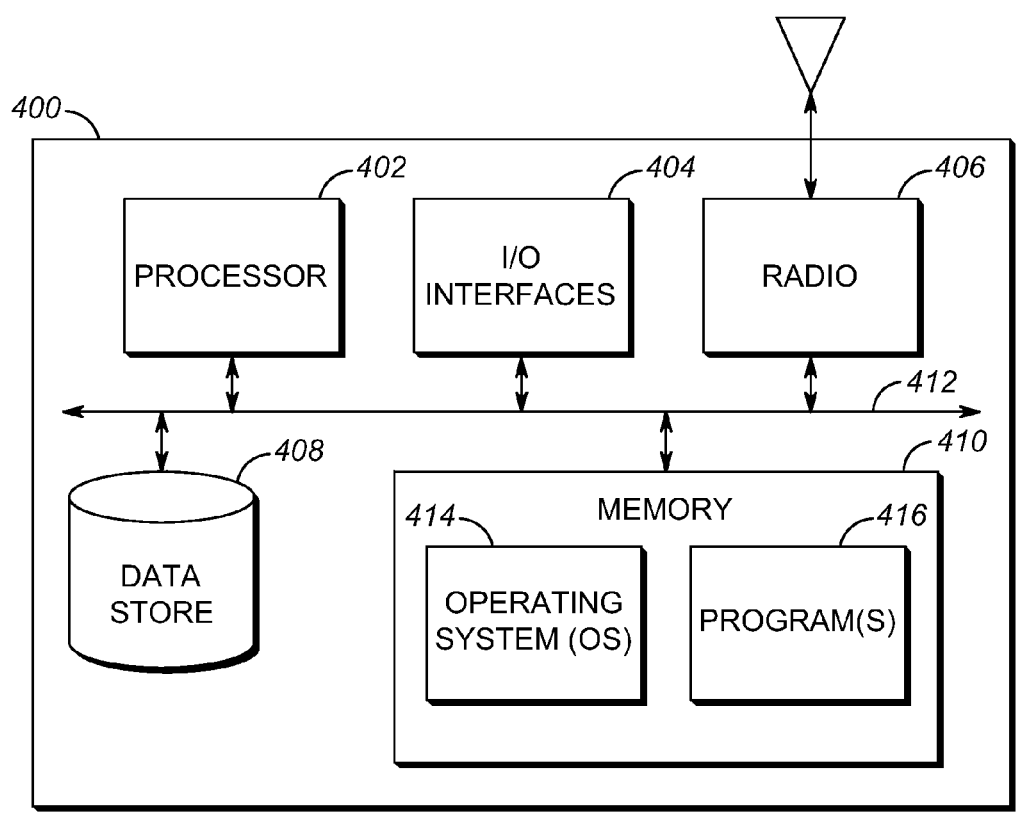
FIG. 7 is a block diagram of a mobile device which may be used in the network of FIGS. 1-2 or the like in accordance with some embodiments.

FIG. 7 is a block diagram of a mobile device 400, which may be used in the network 10 or the like in accordance with some embodiments. For example, the mobile device 400 can include, without limitation, a smart phone, a two-way radio, a tablet, a vehicle modem, a drone/robot, etc. The mobile device 400 can be a digital device that, in terms of hardware architecture, generally includes a processor 402, input/output (I/O) interfaces 404, radio(s) 406, a data store 408, and memory 410. It should be appreciated by those of ordinary skill in the art that FIG. 7 depicts the mobile device 400 in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the memory 410, a semiconductor-based microprocessor (in the form of a microchip or chip set), or generally any device for executing software instructions. When the mobile device 400 is in operation, the processor 402 is configured to execute software stored within the memory 410, to communicate data to and from the memory 410, and to generally control operations of the mobile device 400 pursuant to the software instructions. In an exemplary embodiment, the processor 402 may include a mobile optimized processor such as optimized for power consumption and mobile applications. The I/O interfaces 404 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the mobile device 400.

The radio 406 enables wireless communication to an external access device or network. Note, the radio 406 can include multiple radios with any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); Land Mobile Radio (LMR); Digital Mobile Radio (DMR); Terrestrial Trunked Radio (TETRA); Project 25 (P25); and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 7, the software in the memory 410 includes a suitable operating system (O/S) 414 and programs 416. The operating system 414 essentially controls the execution of other computer programs, and provides scheduling, input-output control, file and data management, memory management, and communication control and related services. The programs 416 may include various applications, add-ons, etc. configured to provide end user functionality with the mobile device 400.

In an exemplary embodiment, the mobile device 400 can include instructions, i.e., through a program 416, that, when executed, causes the processor 402 scan, via the radio 406, various wireless channels at an incident scene to identify one or more nodes transmitting a given network identifier; determine a first cluster of the one or more identified nodes are not in communication with a second cluster of the one or more nodes; determine a location for bridging the first cluster and the second cluster; and cause a bridging function to be deployed at the location to provide communication between the first cluster and the second cluster. Optionally, the mobile device 400 can perform the bridging function between the first cluster and the second cluster.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A mobile dynamic mesh cluster bridging method, the method comprising:
   scanning various wireless channels at an incident scene to identify one or more nodes transmitting a given network identifier;
   determining a first cluster of the one or more identified nodes are not in communication with a second cluster of the one or more nodes by detecting a transmission of a common network identifier by two or more nodes each using different BSSIDs or Mesh IDs in a WLAN frame;
   determining a location for bridging the first cluster and the second cluster by locating where the transmission of the common network identifier by two or more nodes each using different BSSIDs or Mesh IDs in the WLAN frame takes place; and
   causing a bridging function to be deployed at the location to provide communication between the first cluster and the second cluster.

2. The mobile dynamic mesh cluster bridging method of claim 1, wherein the first cluster and the second cluster are associated with a single purpose at the incident scene and are disjoint from one another.

3. The mobile dynamic mesh cluster bridging method of claim 1, further comprising:
   scanning the various wireless channels with a mobile device at the incident scene in background manner, wherein the mobile device comprises at least two radios with one used for the scanning.

4. The mobile dynamic mesh cluster bridging method of claim 1, further comprising:
   performing the scanning step, the determining steps, and the causing step by a detection node; and
   causing the bridging function by requesting dispatch of a bridging node to the location.

5. The mobile dynamic mesh cluster bridging method of claim 1, further comprising:
   performing the scanning step, the determining steps, and the causing step by a detection node; and
   causing the bridging function by performing cluster services by the detection node.

6. The mobile dynamic mesh cluster bridging method of claim 1, further comprising:
   causing the bridging function by sending a request to a coordinator with geographic location information, wireless technology or channels needed, cryptographic information, required authorization credentials, and Service Set Identification.

7. The mobile dynamic mesh cluster bridging method of claim 1, further comprising:
   using credentials to authenticate the first cluster and the second cluster with the bridging function.

8. The mobile dynamic mesh cluster bridging method of claim 1, further comprising:
   providing service discovery information to nodes in the first cluster and in the second cluster performing service discovery through the bridging function.

9. The mobile dynamic mesh cluster bridging method of claim 1, further comprising:
   acting as a joint node connecting the first cluster and the second cluster such that all nodes are in communication with each other via the bridging function.

10. The method of claim 1 further comprising the step of:
    summoning a drone to the location.

11. The mobile dynamic mesh cluster bridging method of claim 4, wherein the bridging node comprises any of a mobile device, a drone or robot, and a vehicle.

12. The mobile dynamic mesh cluster bridging method of claim 7, further comprising:
    authenticating each of the first cluster and the second cluster by selecting at least one node in each to peer with and perform mutual authentication utilizing IEEE 802.11i.

13. The mobile dynamic mesh cluster bridging method of claim 7, further comprising:
    creating a robust secure network by a device performing the bridging function with at least one peer in the first cluster and at least one peer in the second cluster.

14. The mobile dynamic mesh cluster bridging method of claim 9, further comprising:
    performing message conversions if the first cluster and the second cluster utilize different wireless communication technologies.

15. The mobile dynamic mesh cluster bridging method of claim 9, further comprising:
    coordinating switching to a same Wi-Fi channel between the first cluster and the second cluster if operating on different channels.

16. The mobile dynamic mesh cluster bridging method of claim 9, further comprising:
    coordinating between the first cluster and the second cluster as part of channel contention to avoid collisions.

17. A mobile device, comprising:
    a network interface;
    a processor communicatively coupled to the network interface; and
    memory storing instructions that, when executed, cause the processor to:
    scan, via the network interface, various wireless channels at an incident scene to identify one or more nodes transmitting a given network identifier;
    determine a first cluster of the one or more identified nodes are not in communication with a second cluster of the one or more nodes by detecting a transmission of a common network identifier by two or more nodes each using different BSSIDs or Mesh IDs in a WLAN frame;
    determine a location for bridging the first cluster and the second cluster by identifying a location by locating where the transmission of the common network identifier by two or more nodes each using different BSSIDs or Mesh IDs in the WLAN frame; and
    cause a bridging function to be deployed at the location to provide communication between the first cluster and the second cluster.

18. The mobile device of claim 17, wherein the memory storing instructions that, when executed, further cause the processor to:
    perform the bridging function between the first cluster and the second cluster.

19. A coordinating server, comprising:
    a network interface communicatively coupled to a plurality of devices at an incident scene;
    a processor communicatively coupled to the network interface; and
    memory storing instructions that, when executed, cause the processor to
    receive a request from a detection node to perform a bridging function between a first cluster and a second cluster at a specified location, wherein the first cluster and the second cluster are disjoint from one another and are at the incident scene and wherein the specific location comprises a location where a transmission of a common network identifier by two or more nodes each using different BSSIDs or Mesh IDs in a WLAN frame takes place;
identify a bridging node at or near the specific location to perform the bridging function; and
transmit the request to the bridging node to perform the bridging function.

* * * * *